United States Patent
Thompson et al.

(10) Patent No.: US 8,832,594 B1
(45) Date of Patent: Sep. 9, 2014

(54) SPACE-OPTIMIZED DISPLAY OF MULTI-COLUMN TABLES WITH SELECTIVE TEXT TRUNCATION BASED ON A COMBINED TEXT WIDTH

(71) Applicant: Palantir Technologies, Inc., Palo Alto, CA (US)

(72) Inventors: James Thompson, San Francisco, CA (US); Joshua Goldenberg, Menlo Park, CA (US)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

(21) Appl. No.: 14/137,120

(22) Filed: Dec. 20, 2013

Related U.S. Application Data

(60) Provisional application No. 61/899,803, filed on Nov. 4, 2013.

(51) Int. Cl.
 *G06F 3/048* (2013.01)
 *G06F 17/24* (2006.01)
 *G06F 3/0481* (2013.01)

(52) U.S. Cl.
 CPC ............ *G06F 17/245* (2013.01); *G06F 3/0481* (2013.01)
 USPC .......................................... 715/801; 715/256

(58) Field of Classification Search
 CPC ...... G06F 17/24; G06F 17/245; G06F 3/0481
 USPC ................................................. 715/256, 801
 See application file for complete search history.

(56) References Cited

U.S. PATENT DOCUMENTS

| | | | |
|---|---|---|---|
| 6,161,098 A | 12/2000 | Wallman | |
| 6,219,053 B1 | 4/2001 | Tachibana et al. | |
| 6,232,971 B1 | 5/2001 | Haynes | |
| 6,279,018 B1 * | 8/2001 | Kudrolli et al. | 715/234 |
| 6,341,310 B1 | 1/2002 | Leshem et al. | |
| 6,369,835 B1 | 4/2002 | Lin | |
| 6,549,944 B1 | 4/2003 | Weinberg et al. | |

(Continued)

FOREIGN PATENT DOCUMENTS

WO    WO 2010/030913    3/2010

OTHER PUBLICATIONS

"A First Look: Predicting Market Demand for Food Retail using a Huff Analysis," TRF Policy Solutions, Jul. 2012, pp. 30.

(Continued)

*Primary Examiner* — Cesar Paula
*Assistant Examiner* — Tyler J Schallhorn
(74) *Attorney, Agent, or Firm* — Knobbe, Martens, Olson & Bear, LLP

(57) ABSTRACT

The display of a multi-column table can be optimized. For example, a container, such as a multi-column table, can have a first container width. The container includes first text, second text, and a divider, such as an icon, whitespace, or text, between the first text and the second text. The first text, the second text, and the divider can have a combined text width. The container can be resized to a second container width that is smaller than the first container width. If it is determined that the combined text width is then greater than the second container width, the first text, the second text, or both can be abbreviated until the combined text width is less than the second container width.

14 Claims, 11 Drawing Sheets

(56) References Cited

U.S. PATENT DOCUMENTS

| | | | | |
|---|---|---|---|---|
| 6,642,945 | B1* | 11/2003 | Sharpe | 715/788 |
| 6,714,936 | B1 | 3/2004 | Nevin, III | |
| 6,839,745 | B1 | 1/2005 | Dingari et al. | |
| 6,978,419 | B1* | 12/2005 | Kantrowitz | 715/209 |
| 7,139,800 | B2 | 11/2006 | Bellotti et al. | |
| 7,171,427 | B2 | 1/2007 | Witkowski et al. | |
| 7,278,105 | B1 | 10/2007 | Kitts | |
| 7,379,903 | B2 | 5/2008 | Caballero et al. | |
| 7,426,654 | B2 | 9/2008 | Adams et al. | |
| 7,454,466 | B2 | 11/2008 | Bellotti et al. | |
| 7,467,375 | B2 | 12/2008 | Tondreau et al. | |
| 7,525,422 | B2 | 4/2009 | Bishop et al. | |
| 7,617,232 | B2 | 11/2009 | Gabbert et al. | |
| 7,627,812 | B2* | 12/2009 | Chamberlain et al. | 715/217 |
| 7,634,717 | B2* | 12/2009 | Chamberlain et al. | 715/217 |
| 7,703,021 | B1 | 4/2010 | Flam | |
| 7,716,077 | B1 | 5/2010 | Mikurak | |
| 7,770,100 | B2* | 8/2010 | Chamberlain et al. | 715/217 |
| 7,818,658 | B2 | 10/2010 | Chen | |
| 7,962,848 | B2* | 6/2011 | Bertram | 715/254 |
| 8,001,465 | B2* | 8/2011 | Kudrolli et al. | 715/243 |
| 8,001,482 | B2* | 8/2011 | Bhattiprolu et al. | 715/777 |
| 8,015,487 | B2 | 9/2011 | Roy et al. | |
| 8,225,201 | B2* | 7/2012 | Michael | 715/254 |
| 8,230,333 | B2 | 7/2012 | Decherd et al. | |
| 8,312,367 | B2* | 11/2012 | Foster | 715/227 |
| 8,447,722 | B1 | 5/2013 | Ahuja et al. | |
| 8,489,641 | B1 | 7/2013 | Seefeld et al. | |
| 8,514,082 | B2 | 8/2013 | Cova et al. | |
| 8,554,579 | B2 | 10/2013 | Tribble et al. | |
| 8,577,911 | B1 | 11/2013 | Stepinski et al. | |
| 8,620,641 | B2* | 12/2013 | Farnsworth et al. | 704/1 |
| 8,689,108 | B1 | 4/2014 | Duffield et al. | |
| 2001/0021936 | A1* | 9/2001 | Bertram | 707/517 |
| 2002/0130907 | A1 | 9/2002 | Chi et al. | |
| 2002/0147805 | A1 | 10/2002 | Leshem et al. | |
| 2002/0174201 | A1 | 11/2002 | Ramer et al. | |
| 2003/0028560 | A1* | 2/2003 | Kudrolli et al. | 707/509 |
| 2003/0200217 | A1 | 10/2003 | Ackerman | |
| 2004/0181554 | A1 | 9/2004 | Heckerman et al. | |
| 2005/0028094 | A1 | 2/2005 | Allyn | |
| 2005/0125715 | A1 | 6/2005 | Franco et al. | |
| 2005/0180330 | A1 | 8/2005 | Shapiro | |
| 2006/0026170 | A1 | 2/2006 | Kreitler et al. | |
| 2006/0045470 | A1* | 3/2006 | Poslinski et al. | 386/68 |
| 2006/0074866 | A1* | 4/2006 | Chamberlain et al. | 707/3 |
| 2006/0080619 | A1 | 4/2006 | Carlson et al. | |
| 2006/0129746 | A1 | 6/2006 | Porter | |
| 2007/0011304 | A1 | 1/2007 | Error | |
| 2007/0174760 | A1* | 7/2007 | Chamberlain et al. | 715/504 |
| 2007/0266336 | A1 | 11/2007 | Nojima et al. | |
| 2008/0069081 | A1 | 3/2008 | Chand et al. | |
| 2008/0077597 | A1 | 3/2008 | Butler | |
| 2008/0077642 | A1 | 3/2008 | Carbone et al. | |
| 2008/0263468 | A1 | 10/2008 | Cappione et al. | |
| 2008/0276167 | A1* | 11/2008 | Michael | 715/273 |
| 2009/0076845 | A1 | 3/2009 | Bellin et al. | |
| 2009/0132953 | A1 | 5/2009 | Reed et al. | |
| 2009/0164934 | A1* | 6/2009 | Bhattiprolu et al. | 715/777 |
| 2009/0187548 | A1 | 7/2009 | Ji et al. | |
| 2009/0281839 | A1 | 11/2009 | Lynn et al. | |
| 2009/0287470 | A1* | 11/2009 | Farnsworth et al. | 704/3 |
| 2010/0070897 | A1 | 3/2010 | Aymeloglu et al. | |
| 2010/0122152 | A1* | 5/2010 | Chamberlain et al. | 715/220 |
| 2010/0293174 | A1 | 11/2010 | Bennett et al. | |
| 2010/0325581 | A1 | 12/2010 | Finkelstein et al. | |
| 2011/0047159 | A1 | 2/2011 | Baid et al. | |
| 2011/0060753 | A1 | 3/2011 | Shaked et al. | |
| 2011/0107196 | A1* | 5/2011 | Foster | 715/227 |
| 2011/0167105 | A1 | 7/2011 | Ramakrishnan et al. | |
| 2011/0208724 | A1 | 8/2011 | Jones et al. | |
| 2012/0066166 | A1 | 3/2012 | Curbera et al. | |
| 2012/0144335 | A1 | 6/2012 | Abeln et al. | |
| 2012/0221580 | A1 | 8/2012 | Barney | |
| 2012/0246148 | A1 | 9/2012 | Dror | |
| 2012/0323888 | A1 | 12/2012 | Osann, Jr. | |
| 2012/0330973 | A1 | 12/2012 | Ghuneim et al. | |
| 2013/0046842 | A1 | 2/2013 | Muntz et al. | |
| 2013/0073377 | A1 | 3/2013 | Heath | |
| 2013/0097482 | A1* | 4/2013 | Marantz et al. | 715/234 |
| 2013/0262527 | A1* | 10/2013 | Hunter et al. | 707/805 |
| 2013/0290011 | A1 | 10/2013 | Lynn et al. | |
| 2013/0290825 | A1 | 10/2013 | Arndt et al. | |
| 2014/0019936 | A1 | 1/2014 | Cohanoff | |
| 2014/0032506 | A1 | 1/2014 | Hoey et al. | |
| 2014/0033010 | A1 | 1/2014 | Richardt et al. | |

OTHER PUBLICATIONS

Acklen, Laura, "Absolute Beginner's Guide to Microsoft Word 2003," Dec. 24, 2003, pp. 15-18, 34-41, 308-316.

Ananiev et al., "The New Modality API," http://web.archive.org/web/20061211011958/http://java.sun.com/developer/technicalArticles/J2SE/Desktop/javase6/modality/ Jan. 2006, pp. 8.

Appacts, "Smart Thinking for Super Apps," http://www.appacts.com printed Jul. 18, 2013 in 4 pages.

Apsalar, "Data Powered Mobile Advertising," "Free Mobile App Analytics" and various analytics related screen shots http://apsalar.com Printed Jul. 18, 2013 in 8 pages.

Bugzilla@Mozilla, "Bug 18726—[feature] Long-click means of invoking contextual menus not supported," http://bugzilla.mozilla.org/show_bug.cgi?id=18726 printed Jun. 13, 2013 in 11 pages.

Capptain—Pilot Your Apps, http://www.capptain.com Printed Jul. 18, 2013 in 6 pages.

Chen et al., "Bringing Order to the Web: Automatically Categorizing Search Results," CHI 2000, Proceedings of the SIGCHI conference on Human Factors in Computing Systems, Apr. 1-6, 2000, The Hague, The Netherlands, pp. 145-152.

Countly Mobile Analytics, http://count.ly/ Printed Jul. 18, 2013 in 9 pages.

Distimo—App Analytics, http://www.distimo.com/app-analytics Printed Jul. 18, 2013 in 5 pages.

Dramowicz, Ela, "Retail Trade Area Analysis Using the Huff Model," Directions Magazine, Jul. 2, 2005 in 10 pages, http://www.directionsmag.com/articles/retail-trade-area-analysis-using-the-huff-model/123411.

Flurry Analytics, http://www.flurry.com/ Printed Jul. 18, 2013 in 14 pages.

GIS-NET 3 Public—Department of Regional Planning. Planning & Zoning Information for Unincorporated LA County. Retrieved Oct. 2, 2013 from http://gis.planning.lacounty.gov/GIS-NET3_Public/Viewer.html.

Google Analytics Official Website—Web Analytics & Reporting, http://www.google.com/analytics.index.html Printed Jul. 18, 2013 in 22 pages.

Griffith, Daniel A., "A Generalized Huff Model," Geographical Analysis, Apr. 1982, vol. 14, No. 2, pp. 135-144.

Hibbert et al., "Prediction of Shopping Behavior Using a Huff Model Within a GIS Framework," Healthy Eating in Context Mar. 18, 2011, pp. 16.

Huff et al., "Calibrating the Huff Model Using ArcGIS Business Analyst," ESRI, Sep. 2008, pp. 33.

Huff, David L., "Parameter Estimation in the Huff Model," ESRI, ArcUser, Oct.-Dec. 2003, pp. 34-36.

Image "Histogram 2" located on webpage http://www.ncl.ucar.edu/Applications/histo.shtml, 2006, as printed Nov. 5, 2013 in 6 pages.

Image "Histogram 6" located on webpage http://www.ncl.ucar.edu/Applications/histo.shtml, 2006, as printed Nov. 5, 2013 in 6 pages.

Image "Histogram 8" located on webpage http://www.ncl.ucar.edu/Applications/histo.shtml, 2006, as printed Nov. 5, 2013 in 6 pages.

Image "Horizon Histogram" located on webpage http://stonefieldquery.com/bars.html, 2012, as printed Nov. 5, 2013 in 3 pages.

Image "0010" located on webpage http://www.sigmaplot.com/products/sigmaplot/productuses/prod-uses1.php, 2010, as printed Nov. 5, 2013 in 5 pages.

Image "Price by Volume (PBV) horizontal histogram" located on webpage http://fxcodebase.com/code/viewtopic.php?f=27&t=236, 2010, as printed Nov. 5, 2013 in 25 pages.

(56) References Cited

OTHER PUBLICATIONS

Image "Plot Gallery Rows" located on webpage http://soft.proindependent.com/doc/manual-en/x1223.html, 2012, as printed Nov. 5, 2013 in 16 pages.

Image "Plot Gallery Stack Bar" located on webpage http://soft.proindependent.com/doc/manual-en/x1223.html, 2012, as printed Nov. 5, 2013 in 16 pages.

International Search Report and Written Opinion in Application No. PCT/US2009/056703, dated Mar. 15, 2010.

Kontagent Mobile Analytics, http://www.kontagent.com/ Printed Jul. 18, 2013 in 9 pages.

Liu, Tianshun, "Combining GIS and the Huff Model to Analyze Suitable Locations for a New Asian Supermarket in the Minneapolis and St. Paul, Minnesota USA," Papers in Resource Analysis, 2012, vol. 14, pp. 8.

Localytics—Mobile App Marketing & Analytics, http://www.localytics.com/ Printed Jul. 18, 2013 in 12 pages.

Manske, "File Saving Dialogs," http://www.mozilla.org/editor/ui_specs/FileSaveDialogs.html Jan. 20, 1999, pp. 7.

Map of San Jose, CA. Retrieved Oct. 2, 2013 from http://maps.google.com.

Map of San Jose, CA. Retrieved Oct. 2, 2013 from http://maps.bing.com.

Map of San Jose, CA. Retrieved Oct. 2, 2013 from http://maps.yahoo.com.

Microsoft—Developer Network, "Getting Started with VBA in Word 2010," Apr. 2010, http://msdn.microsoft.com/en-us/library/ff604039%28v=office.14%29.aspx as printed Apr. 4, 2014 in 17 pages.

Mixpanel—Mobile Analytics, https://mixpanel.com/ Printed Jul. 18, 2013 in 13 pages.

Microsoft Office—Visio, "About connecting shapes," http://office.microsoft.com/en-us/visio-help/about-connecting-shapes-HP085050369.aspx printed Aug. 4, 2011 in 6 pages.

Microsoft Office—Visio, "Add and glue connectors with the Connector tool," http://office.microsoft.com/en-us/visio-help/add-and-glue-connectors-with-the-connector-tool-HA010048532.aspx?CTT=1 printed Aug. 4, 2011 in 1 page.

Music Machinery, "Controlling the Artist Distribution in Playlists," http://www.musicmachinery.com/tag/code/ posted by Paul, Jan. 12, 2012, in 27 pages.

Open Web Analytics (OWA), http://www.openwebanalytics.com/ Printed Jul. 19, 2013 in 5 pages.

Piwik—Free Web Analytics Software. http://piwik.org/ Printed Jul. 19, 2013 in 18 pp.

StatCounter—Free Invisible Web Tracker, Hit Counter and Web Stats, http://statcounter.com/ Printed Jul. 19, 2013 in 17 pages.

TestFlight—Beta Testing on the Fly, http://testflightapp.com/ Printed Jul. 18, 2013 in 3 pages.

trak.io, http://trak.io/ printed Jul. 18, 2013 in 3 pages.

UserMetrix, http://usermetrix.com/android-analytics printed Jul. 18, 2013 in 3 pages.

* cited by examiner

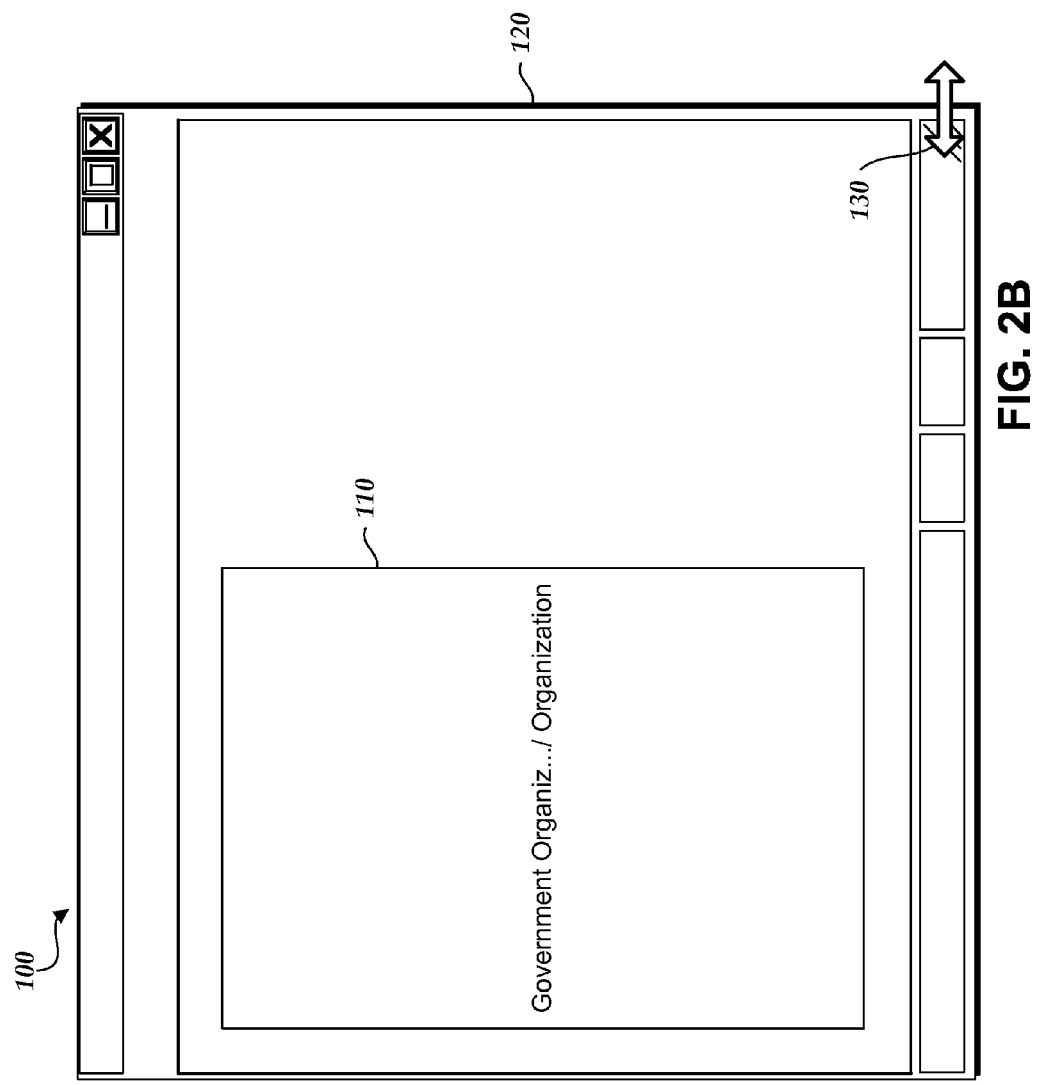

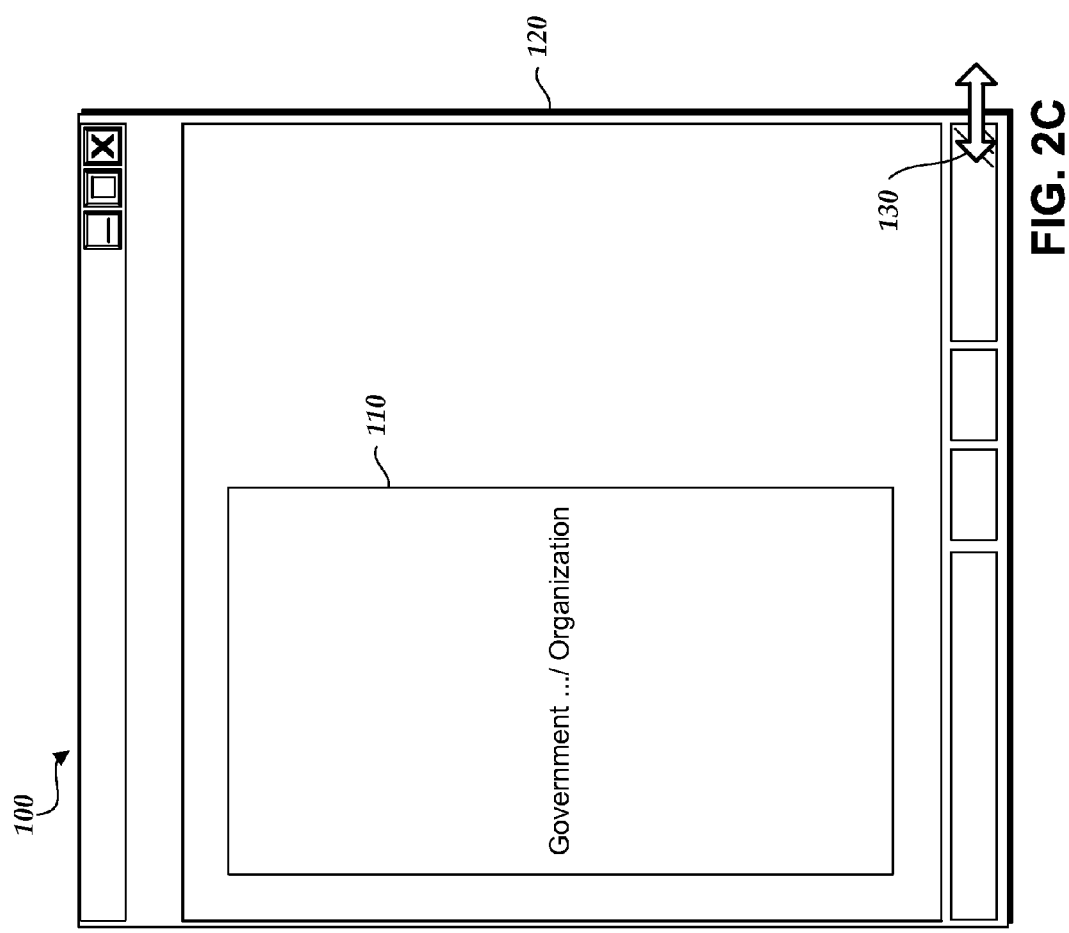

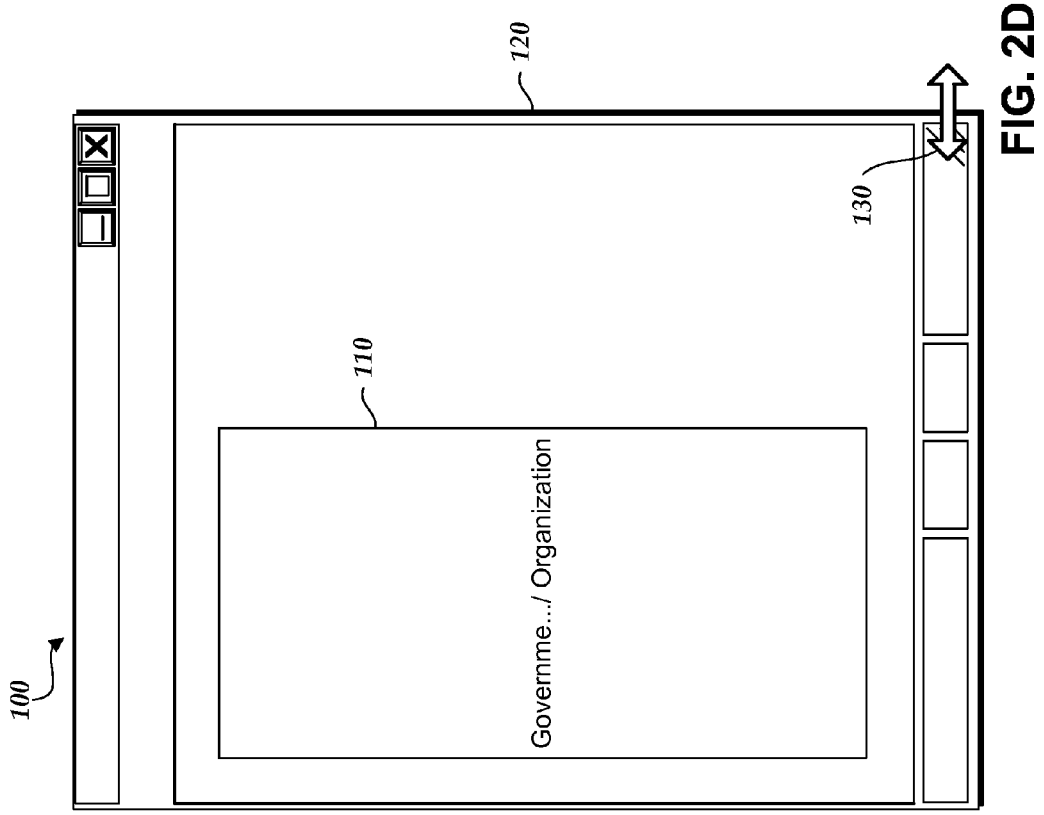

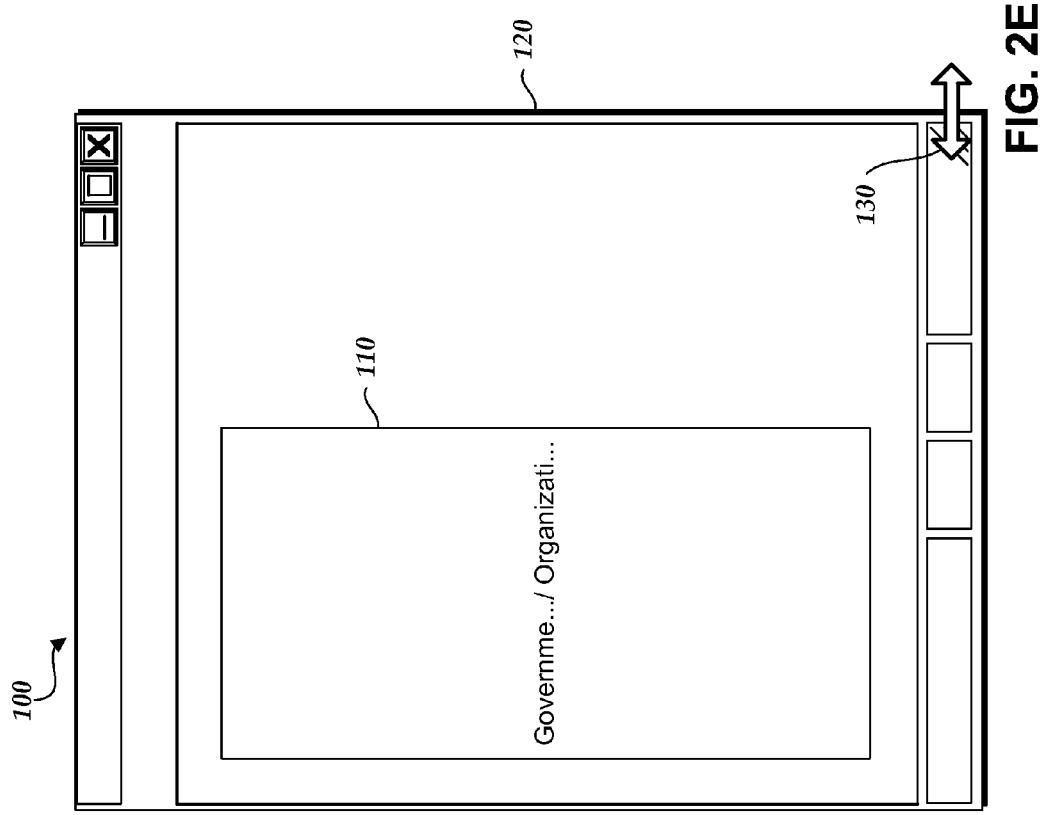

SPACE-OPTIMIZED DISPLAY OF MULTI-COLUMN TABLES WITH SELECTIVE TEXT TRUNCATION BASED ON A COMBINED TEXT WIDTH

CROSS-REFERENCE TO RELATED APPLICATIONS

This application claims a priority benefit under 35 U.S.C. §119 to U.S. Provisional Patent Application No. 61/899,803, filed on Nov. 4, 2013, and titled "SPACE-OPTIMIZED DISPLAY OF MULTI-COLUMN TABLES," which is hereby incorporated by reference herein in its entirety.

TECHNICAL FIELD

The present disclosure relates to systems and techniques for displaying a multi-column table.

BACKGROUND

Computer operating systems, software applications, web applications, and the like, often allow user interactions with graphical user interfaces. The graphical user interface can support content panes that include containers, such as tables with one or more columns. Each of the columns of a table can include text, images, videos, and/or the like. In some instances, the content panes are resizable. However, when resizing a content pane, the contents of the table may not be displayed properly.

SUMMARY

Generally, when a content pane is resized into a smaller form, the content of a table having multiple columns may be wider than a width of the resized content pane. Thus, the content in one or more columns may be displayed such that some or all of the content is hidden. However, as the content pane is resized, techniques described herein can be used to ensure that columns are dynamically adjusted such that the information in one column is not further reduced if the column already displays less information than another column. For example, a first column of a table could include first text and a second column of the table could include second text. The first column and the second column may be separated by an icon, whitespace, or text (e.g., a forward slash) referred to herein as a divider. As the horizontal width of the content pane is resized to a smaller value, the individual widths and/or a combined width of the first column, the second column, and the divider can be analyzed. In one embodiment, if the combined width is greater than the horizontal width of the content pane, then the first column and/or the second column can also be resized to a smaller value. If a width of the first column is greater than a width of the second column, then the width of the first column can be reduced until the combined width is less than the horizontal width of the content pane. Any text in the first column can be abbreviated to fit within the resized first column. If the width of the first column is less than the width of the second column, then the width of the second column can be reduced until the combined width is less than the horizontal width of the content pane. Any text in the second column can be abbreviated to fit within the resized second column. If the width of the first column is equal to the width of the second column, then the width of the first column and the second column both can be reduced until the combined width is less than the horizontal width of the content pane. Any text in the first column and the second column can be abbreviated to fit within the resized first column and second column, respectively.

One aspect of this disclosure provides a method for optimizing display of a multi-column table. The method comprises displaying a container of a first container width. The container may comprise first text and second text. A combined text width comprising a first width of the first text, a second width of the second text, and a divider width of an icon, whitespace, or text between the first text and the second text may be less than the first container width. The method further comprises resizing the container to a second container width that is smaller than the first container width. The method further comprises determining whether the combined text width is greater than the second container width. The method further comprises, in response to determining that the combined text width is greater than the second container width, in response to determining that the first text width is greater than the second text width, abbreviating the first text until the combined text width is less than the second container width or the first text width is equal to the second text width. The method further comprises, in response to determining that the combined text width is greater than the second container width, in response to determining that the second text width is greater than the first text width, abbreviating the second text until the combined text width is less than the second container width or the first text width is equal to the second text width. The method further comprises, in response to determining that the combined text width is greater than the second container width, in response to determining that the first text width is equal to the second text width, abbreviating the first text and the second text equally until the combined text width is less than the second container width.

Another aspect of this disclosure provides a computing system configured to optimize display of a multi-column table. The computer system comprises a network interface that is coupled to a data network for receiving and transmitting one or more packet flows. The computer system further comprises a computer processor. The computer system further comprises a computer readable storage medium storing program instructions configured for execution by the computer processor in order to cause the computing system to display a container of a first container width. The container may comprise a first column and a second column. A combined width comprising a first width of the first column and a second width of the second column may be less than the first container width. The one or more stored program instructions may further cause the processor to resize the container to a second container width that is smaller than the first container width. The one or more stored program instructions may further cause the processor to determine whether the combined width is greater than the second container width. The one or more stored program instructions may further cause the processor to, in response to the determination that the combined width is greater than the second container width, in response to a determination that the first width is greater than the second width, abbreviating the first column until the combined width is less than the second container width or the first width is equal to the second width. The one or more stored program instructions may further cause the processor to, in response to the determination that the combined width is greater than the second container width, in response to a determination that the second width is greater than the first width, abbreviating the second column until the combined width is less than the second container width or the first width is equal to the second width. The one or more stored program instructions may further cause the processor to, in response to the determination that the combined width is greater than the second container width, in response to a determination that the first width is equal to the second width, abbreviating the first column and the second column equally until the combined width is less than the second container width.

Another aspect of this disclosure provides a non-transitory computer-readable medium comprising one or more program instructions recorded thereon, the instructions configured for execution by a computing system comprising one or more processors in order to cause the computing system to display a container of a first container width. The container may comprise a first column and a second column. A combined width comprising a first width of the first column and a second width of the second column may be less than the first container width. The instructions may be further configured to cause the computing system to resize the container to a second container width that is smaller than the first container width. The instructions may be further configured to cause the computing system to determine whether the combined width is greater than the second container width. The instructions may be further configured to cause the computing system to, in response to the determination that the combined width is greater than the second container width, in response to a determination that the first width is greater than the second width, abbreviating the first column until the combined width is less than the second container width or the first width is equal to the second width. The instructions may be further configured to cause the computing system to, in response to the determination that the combined width is greater than the second container width, in response to a determination that the second width is greater than the first width, abbreviating the second column until the combined width is less than the second container width or the first width is equal to the second width. The instructions may be further configured to cause the computing system to, in response to the determination that the combined width is greater than the second container width, in response to a determination that the first width is equal to the second width, abbreviating the first column and the second column equally until the combined width is less than the second container width.

BRIEF DESCRIPTION OF THE DRAWINGS

FIGS. 2A-2F illustrate user interfaces displaying a space-optimized version of the resizable table.

DETAILED DESCRIPTION

Overview

Figure 1:
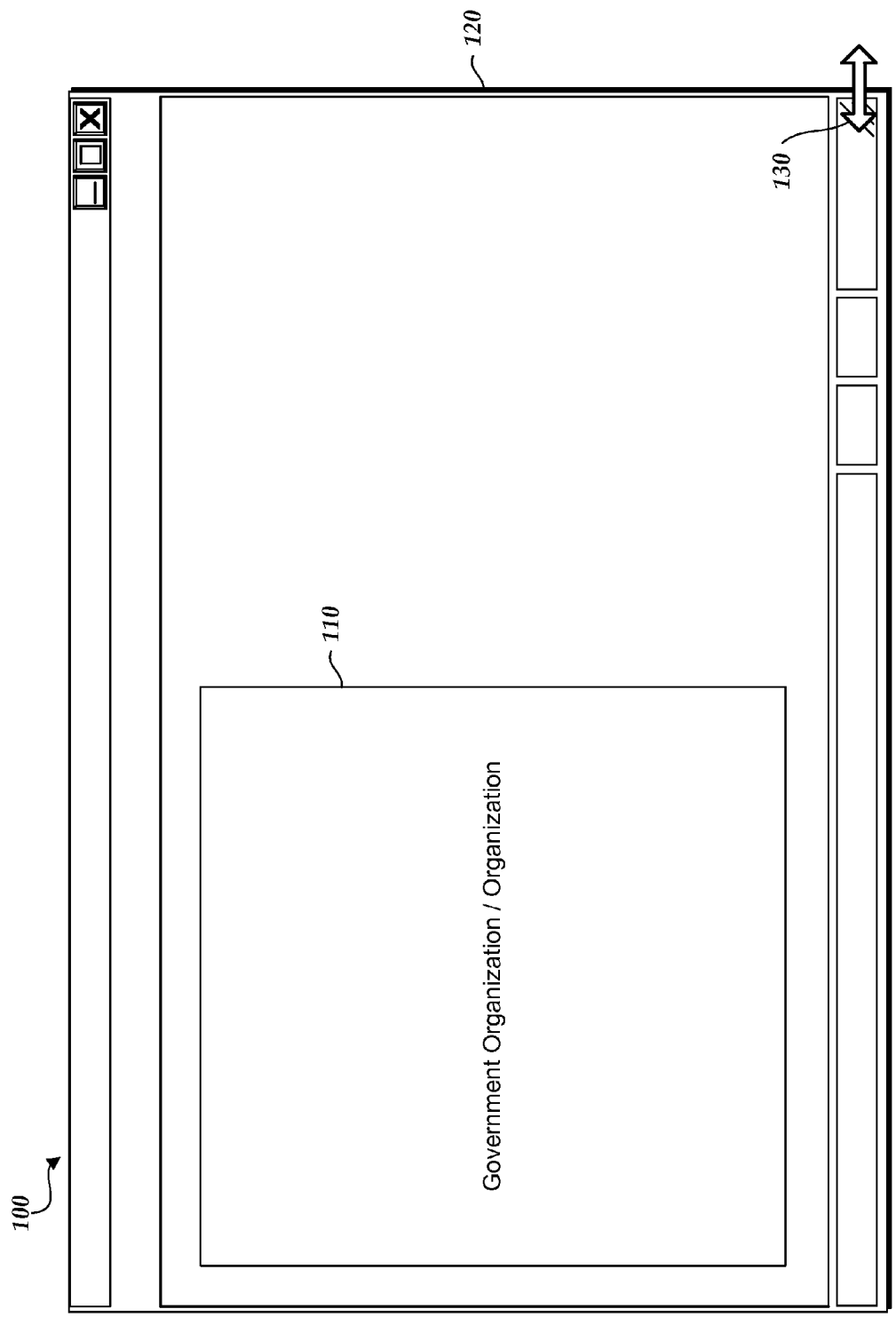
FIG. 1 illustrates a user interface displaying a resizable table.

Disclosed herein are various systems and methods that allow for optimized display of a multi-column table. In particular, the systems and methods disclosed herein can allow for the columns in a table to be adjusted so as to ensure that the information in one column is not further reduced if the column already displays less information than another column when the width of the table is reduced. As used herein, a "width" can refer to a numerical measure of length (e.g., a number of pixels, a percentage, centimeters, inches, etc.) or can refer to a number of characters.

As described above, a resizable content pane (e.g., a window displayed within the graphical user interface of an operation system) can include containers. For example, the containers could be tables with one or more columns. Each of the columns of a table can include text, images, videos, and/or the like.

Generally, when a content pane is resized into a smaller form, the size of the columns may be wider than a width of the resized content pane. Thus, the content in the columns may be displayed such that some or all of the content is hidden. However, as the content pane is resized, the various systems and methods described herein can allow the columns to be dynamically adjusted such that the information in one column is not further reduced if the column already displays less information than another column.

For example, a first column of a table could include first text and a second column of the table could include second text. The first column and the second column may be separated by an icon, whitespace, text (e.g., a forward slash), or other content that divides the information included in the two columns and is referred to herein as a divider. As the horizontal width of the content pane is reduced, the first column and the second column can be adjusted based on the width of the text displayed in each respective column. If the width of the first text is greater than the width of the second text, then the first text can be abbreviated, and vice-versa. If the width of the first text is the same as the width of the second text, then the first text and the second text can be abbreviated equally or nearly equally. The first text and/or the second text may be abbreviated until the width of the table is less than the width of the content pane.

In an embodiment, the techniques described herein apply for content present in a single column or area of a user interface (e.g., there may be no columns). For example, a content pane can include one or more columns, where the first column includes first text and second text separated by a divider. As the horizontal width of the content pane is resized to a smaller value, instead of analyzing the combined width of the first column, the second column, and the divider, the combined width of the first text, the second text, and the divider can be analyzed. Based on a comparison of the combined width and the horizontal width of the content pane, the first text and/or the second text can then be resized to a smaller width (e.g., the text can be abbreviated) according to the rules as discussed above with respect to the first column and the second column. Thus, any discussion herein regarding resizing columns may be applied to resizing of text in embodiments where multiple text items are displayed in a single user interface and/or column. For example, references herein to a first column and second column may be read to cover first text and second text (that is not necessarily in separate columns).

In some embodiments, a table can include one or more columns that include text and another column that includes a histogram (or other graphical feature) associated with the text. As an example, multi-column table 310 in FIG. 3A may include one or more columns that include text (e.g., text 370 and 372) and another column that includes histograms 320-341. A number of occurrences may be associated with the text 370 and a number of occurrences may be associated with the text 372. A width of a histogram 332 in FIG. 3A can be based on a combination of the number of occurrences associated with the text 370 and the number of occurrences associated with the text 372. The width of the histogram 332 can also be based on a total number of conflicts associated with the entire set of text in the multi-column table 310. In further embodiments, a histogram can further include a horizontal bar that corresponds with a number of conflicts between the occurrences associated with text. As an example, a width of a horizontal bar 374 in FIG. 3A can depend on a number of conflicts between the occurrences associated with the text 370 and the occurrences associated with the text 372. For instance, a database may include a list of titles for the employees of a company. The first text may be "Engineer" and the second text may be "engineer." The total number of employees with the title "Engineer" or "engineer" may be 100, and the width of the histogram may reflect this. However, there may be a certain number of employees, for example 20, that carry the title "Engineer" and "engineer." The width of the horizontal bar within the histogram may reflect the number of conflicts. In another instance, a database (or other data set) may include a total number of conflicts for various conflict types. One of the conflict types may be "Titles," which may include the list of titles for the employees of a company described above. The total number of conflicts may be 1000, and the width of the histogram may reflect this. As described above, 20 of those conflicts may be between use of the title "Engineer" and "engineer" that are each associated with individual employees, and the width of the horizontal bar 374 within the histogram may reflect those conflicts (20). The horizontal bar can be one of several colors, where the colors are chosen based on the number of conflicts.

Examples of Space-Optimized Multi-Column Tables

FIG. 1 illustrates a user interface 100 displaying a resizable table 110. The user interface 100 can be generated by an electronic device, such as the computer system 500 described below. As illustrated in FIG. 1, the table 110 is comprised within a resizable content pane 120. However, in other embodiments the table 110 may be independent of any content panes and may be resizable via controls built into the table 110.

In the example of FIG. 1, the table 110 includes a column comprising the text "Government Organization" and "Organization," where "Government Organization" and "Organization" are separated by a divider represented as a forward slash. In other embodiments, the table 110 includes two columns, where the first column comprises the text "Government Organization" and the second column comprises the text "Organization," separated by a divider, such as a forward slash.

In one embodiment, the table 110 can be resized by selecting a border or an area around the border of the table 110 using a cursor (e.g., a mouse pointer or a finger) and dragging the cursor in a desired direction. Likewise, the content pane 120 can be resized by selecting a border or an area around the border of the content pane 120 using the cursor and dragging the cursor in a desired direction. As an example, cursor 130 can be placed near or on the border of the content pane 120 to adjust the size of the content pane 120. In some embodiments, resizing the content pane 120 also resizes the table 110. In other embodiments, resizing the content pane 120 only results in the resizing of the table 110 if the content pane 120 is resized to have a smaller width than the table 110.

Figure 2A:
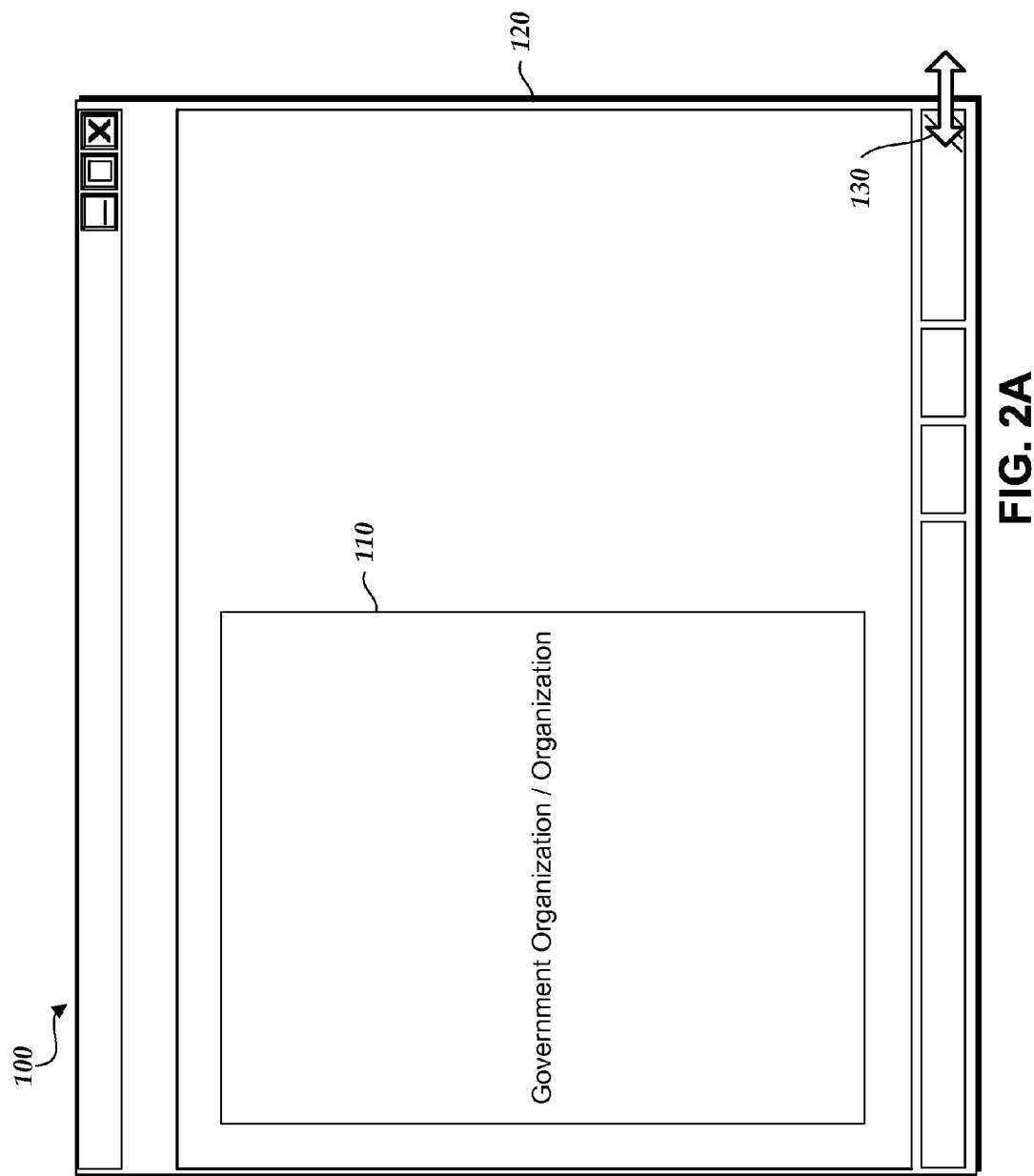

FIGS. 2A-2F illustrate the user interface 100 resizing of the content pane 120 and the space-optimized table 110 in response to input from the user. As illustrated in FIG. 2A, the content pane 120 is resized to have a smaller width than as illustrated in FIG. 1 via cursor 130. In this embodiment, the table 110 is also resized to have a smaller width than as illustrated in FIG. 1 based on the resizing of the content pane 120. In an embodiment, the width of the table 110 is reduced by the same percentage as the reduction in the width of the content pane 120. In some embodiments, the width of the table 110 may not be reduced at all in response to reducing width of the content pane 120 (or at a smaller percentage of changes to the content pane) unless/until the content pane 120 width reaches the table 110 width. Because the width of "Government Organization/Organization" is still less than the width of the table 110, the text has not been changed.

As illustrated in FIG. 2B, the content pane 120 is again resized to a smaller width. In addition, the table 110 is again resized to a smaller width. However, unlike as illustrated in FIG. 2A, the width of "Government Organization/Organization" is greater than the width of the resized table 110. Accordingly, "Government Organization/Organization" is abbreviated to fit within the table 110.

In an embodiment, text to the left of the divider (e.g., the "/") and text to the right of the divider are analyzed (e.g., by the processor of a user device, such as the processor 504 of the computer system 500, described in greater detail below). If the text to the left of the divider ("left text") has a larger width than the text to the right of the divider ("right text"), then the left text is abbreviated until either the left text, the right text, and the divider have a width that is less than the width of the table 110 or the left text and the right text have the same width, at which point both the left text and the right text are abbreviated (e.g., by the same amount) until the left text, the right text, and the divider have a width that is less than the width of the table 110. The same process can be followed if the right text has a larger width than the left text. If the left text and the right text both have the same width, then the left text and the right text are abbreviated (e.g., by the same amount) until the left text, the right text, and the divider have a width that is less than the width of the table 110.

As illustrated in FIG. 2B, the left text has a width that is greater than the width of the right text. Thus, "Government Organization" is abbreviated to "Government Organiz . . . " and "Organization" is not abbreviated. Likewise, as illustrated in FIGS. 2C and 2D, the content pane 120 and the table 110 are again reduced in size. The left text still has a width that is greater than the width of the right text, so "Government Organiz . . . " is further abbreviated to "Government . . . " and then to "Governme . . . " while "Organization" is still not abbreviated.

Figure 2F:
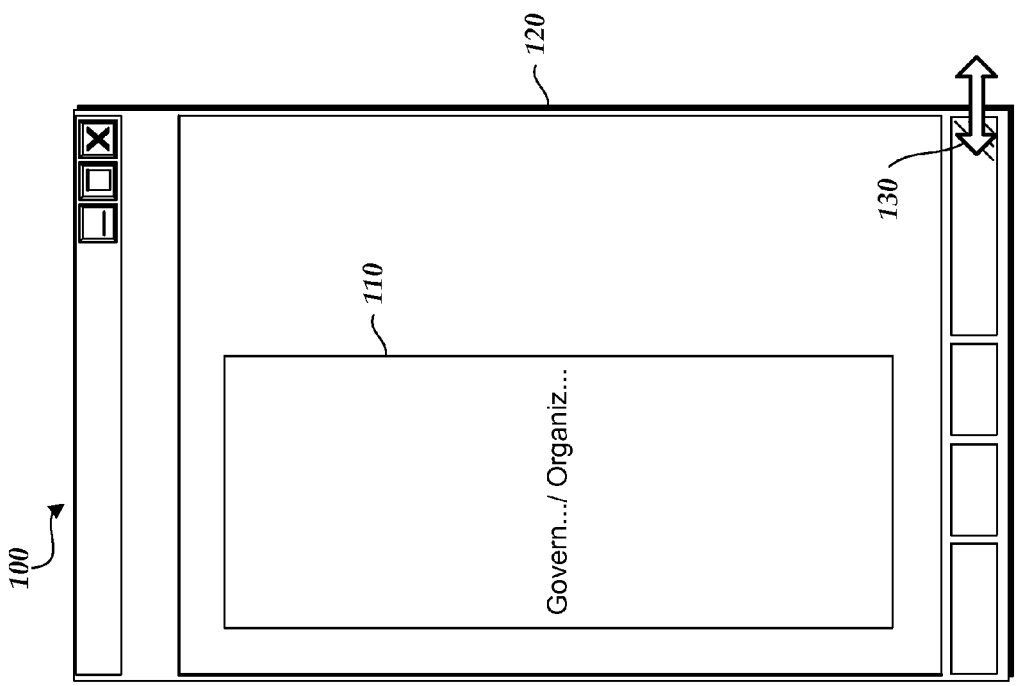

However, as illustrated in FIG. 2D, the left text and the right text have the same width. As illustrated in FIG. 2E, the content pane 120 and the table 110 are again reduced in size. Because the left text and the right text have the same width, the left text and the right text are both abbreviated to "Governme . . . " and "Organizati . . . ," respectively. As the content pane 120 and the table 110 are further reduced in size, as illustrated in FIG. 2F, the left text and the right text are further abbreviated to "Govern . . . " and "Organiz . . . ," respectively.

Figure 3A:
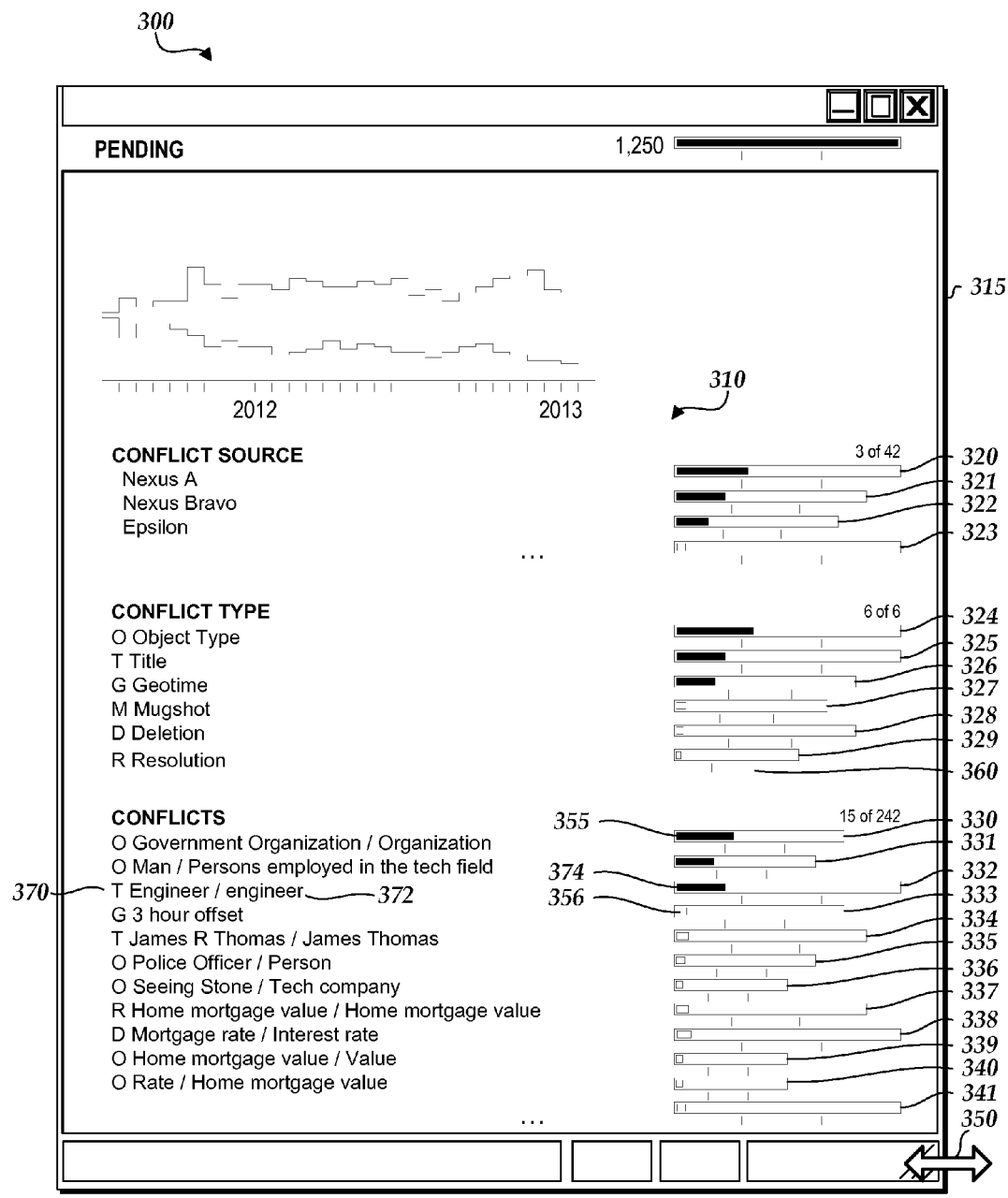
FIGS. 3A-3B illustrate user interfaces displaying a space-optimized version of a multi-column table that includes a histogram.
Figure 3B:
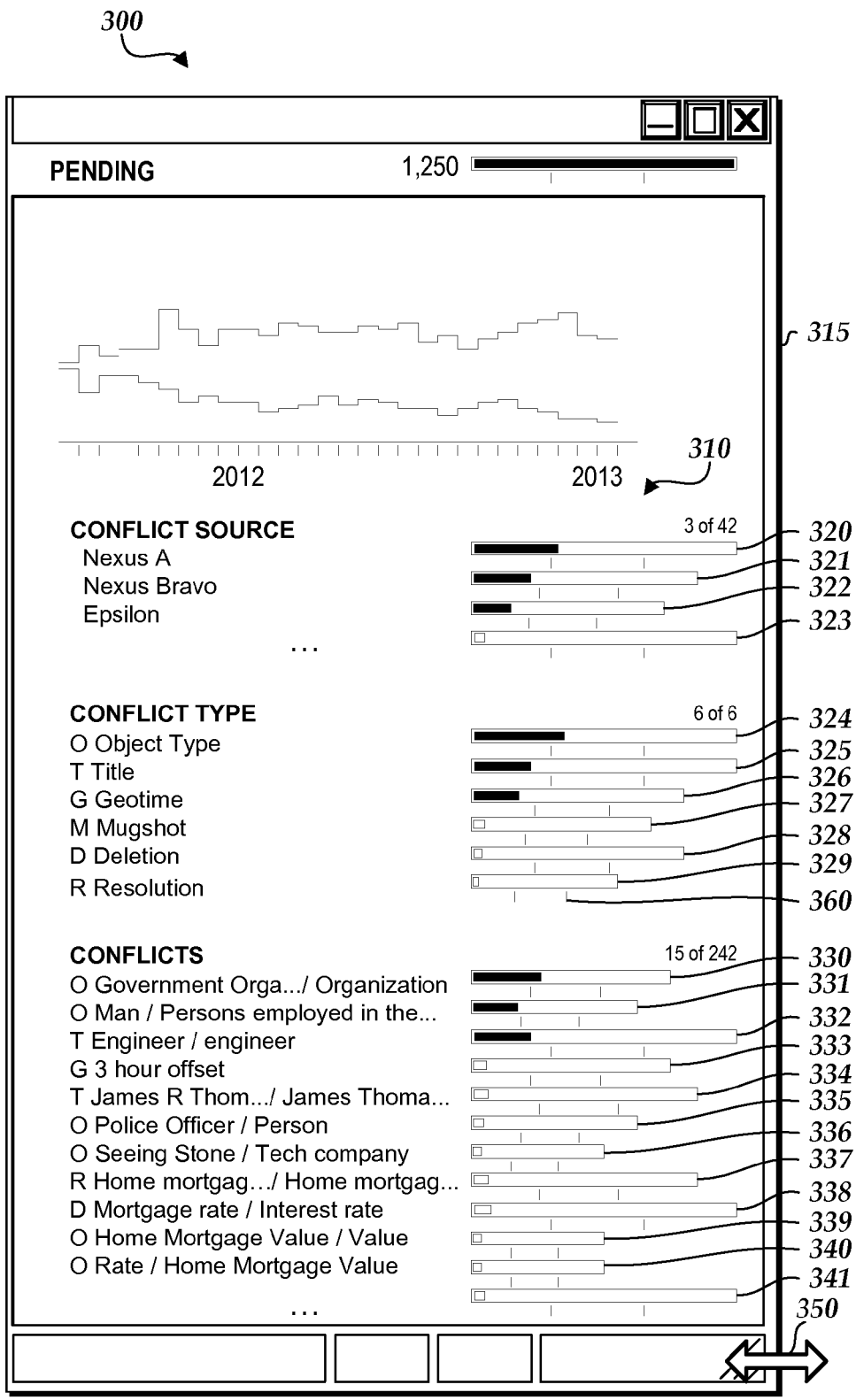

FIGS. 3A-3B illustrate user interfaces 300 displaying a space-optimized version of a multi-column table 310 that includes a histogram, such as histograms 320-341. The user interface 300 can be generated by an electronic device, such as the computer system 500 described below. As illustrated in FIG. 3A, the multi-column table 310 is comprised within a resizable content pane 315. In an embodiment, the multi-column table 310 includes a column comprising text, where at least a portion of the text is separated by a divider represented as a forward slash (e.g., the text includes "Man" and "Persons employed in the tech field" separated by a forward slash). In other embodiments, the multi-column table 310 includes at least two columns, where the first column comprises some text (or whitespace) and the second column comprises other text (or whitespace), where the two columns are separated by the divider represented as a forward slash (e.g., the first column includes "Man" and the second column includes "Persons employed in the tech field").

The multi-column table 310 further includes a column that includes the histograms 320-341. Each histogram 320-341 resides in an individual row and is associated with text in the same respective row. For example, histogram 320 is associated with the text "Nexus A," histogram 324 is associated with the text "Object Type," histogram 330 is associated with the text "Government Organization/Organization," and so on.

The width of a histogram 320-341 may depend on the total number of occurrences corresponding to the text associated with the respective histogram 320-341. For example, the width of the histogram 324 may depend on the total number of occurrences corresponding to "Object Type." As another example, the width of the histogram 330 may depend on a combination of the total number of occurrences corresponding to "Government Organization" and the total number of occurrences corresponding to "Organization." As another example, the width of the histogram 330 may depend on the total number of occurrences of "Government Organization" and "Organization." Alternatively, the width of a histogram 320-341 may depend on a total number of conflicts associated with the text that corresponds with the histograms 320-341.

In an embodiment, the widths of histograms 320-341 have a logarithmic relationship. Thus, the width of a first histogram and the width of a second histogram provide a comparison of the total number of occurrences corresponding to the text associated with each respective histogram using a logarithmic scale. For example, histogram 320 has a width that is longer than the width of histogram 321. If the text associated with the histogram 320 corresponds to 10,000 total occurrences and the histograms 320-341 have a base 10 logarithmic relationship, then the reduced width of histogram 321 may indicate that the text associated with the histogram 321 corresponds to 1,000 total occurrences. In another embodiment, the widths of the histograms 320-341 are the same. For example, the widths of the histograms 320-341 may be the same when the width of a histogram 320-341 depends on a total number of conflicts associated with the text that corresponds with the histograms 320-341.

In an embodiment, each histogram 320-341 includes a horizontal bar. For example, histogram 330 includes horizontal bar 355. For the histograms 320-329 that are associated with text identified as "Conflict Source" or "Conflict Type," the width of each horizontal bar may correspond with the total number of conflicts associated with the text. For the histograms 330-341, the width of each horizontal bar may correspond with the total number of conflicts between occurrences associated with a first portion of the text (e.g., text before the divider) and occurrences associated with a second portion of the text (e.g., text after the divider). For example, the first portion of the text could be "James R Thomas" and the second portion of the text could be "James Thomas." The total number of persons with the title "James R Thomas" could be 500 and the total number of persons with the title "James Thomas" could be 2000. The width of a histogram, such as the histogram 334, may correspond with 2500, the total number of occurrences of both "James R Thomas" and "James Thomas." However, there may be a certain number of persons, for example 125, that carry the title "James R Thomas" and "James Thomas." The width of the horizontal bar within the histogram may reflect the number of conflicts. In other embodiments, the histograms 320-341 each have the same width, and the width corresponds with the total number of conflicts associated with all of the text in the multi-column table 310.

Unlike the width of the histograms 320-341, the widths of each horizontal bar may not have a logarithmic relationship. Rather, the widths of each horizontal bar may have a linear relationship with their respective histogram 320-341. For example, if the number of conflicts is equal to 50% of the total number of occurrences or the total number of conflicts, then the width of a horizontal bar would be half the width of the histogram. One or more indicators, referred to herein as smart ticks, can be displayed underneath or above each histogram 320-341 to aid a user in determining the width of a horizontal bar. In some embodiments, the one or more smart ticks can be evenly spaced apart. For example, two smart ticks can be evenly spaced such that if the width of a horizontal bar lines up with the left-most smart tick, then the total number of conflicts is 33% of the total number of occurrences or the total number of conflicts. Likewise, if the width of the horizontal bar lines up with the right-most smart tick, then the total number of conflicts is 67% of the total number of occurrences or the total number of conflicts.

In an embodiment, the horizontal bars can be one of several colors. For example, a horizontal bar could be a first color if the total number of conflicts exceeds a threshold value and a second color if the total number of conflicts does not exceed the threshold value. As illustrated in FIG. 3A, horizontal bar 355 is a first color because the total number of conflicts exceeds the threshold value and horizontal bar 356 is a second color because the total number of conflicts does not exceed the threshold value.

In an embodiment, the width of content pane 315 can be reduced in a manner as described above with respect to content pane 120 of FIGS. 1 and 2A-2F. In addition, the text in table 310 can be abbreviated in the same manner as described above with respect to table 110 of FIGS. 1 and 2A-2F. As illustrated in FIG. 3A, cursor 350 can be used to resize the content pane 315. As illustrated in FIG. 3B, in response to the content pane 315 being resized to a reduced width, the table 310 is also reduced in width and the text within the one or more columns of table 310 are abbreviated if appropriate according to the procedures described above. In this example, the first text and second text in any rows having text that is too long to fit in the reduced width contact pane 315 may be selectively reduced using the process discussed above. In particular, the longer text is first reduced until the text widths are equal and then both the first and second text are equally reduced, if further width reduction is necessary.

In some embodiments, columns including text are reduced in size before columns including other data, such as the histograms 320-341. For example, the column containing the histograms 320-341 may not be resized until columns containing text can no longer be resized.

Example Process Flows

Figure 4:
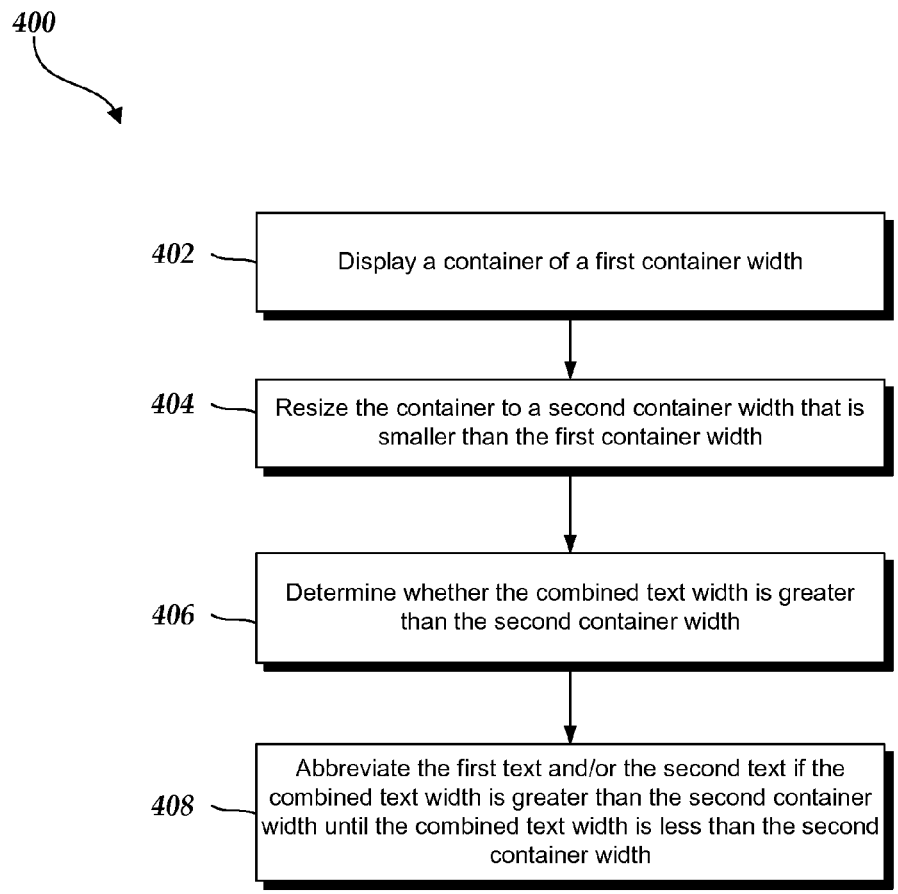
FIG. 4 is a flowchart depicting an illustrative operation of optimizing display of a multi-column table.

FIG. 4 is a flowchart 400 depicting an illustrative method for optimizing display of a multi-column table. Depending on the embodiment, the method of FIG. 4 may be performed by various computing devices, such as devices that execute instructions to generate a graphical user interface. Depending on the embodiment, the method of FIG. 4 may include fewer and/or additional blocks and the blocks may be performed in an order different than illustrated.

In block 402, a container of a first container width is displayed. For example, the container could be a table with one or more columns. The table could include first text and second text, where the first text and the second text are separated by a divider (e.g., a forward slash, an icon, whitespace, etc.). The width of the first text, the second text, and the divider can be referred to as the combined text width.

In block 404, the container can be resized to a second container width that is smaller than the first container width. For example, a cursor can be used to drag the border or an area around the border of the container to resize the container.

In block 406, whether the combined text width is greater than the second container width is determined. The determination can be made immediately after the container is resized.

At block 408, the first text and/or the second text is abbreviated if the combined text width is greater than the second container width until the combined text width is less than the second container width. For example, the first text is abbreviated if the first text width is greater than the second text width until the first text width and the second text width are equal. Then, the first text and the second text are both abbreviated (e.g., equally) until the combined text width is less than the second container width. The second text is similarly abbreviated if the second text width is greater than the first text width. If both the first text width and the second text width are equal, then the first text and the second text are both abbreviated (e.g., equally) until the combined text width is less than the second container width.

Implementation Mechanisms

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 5:
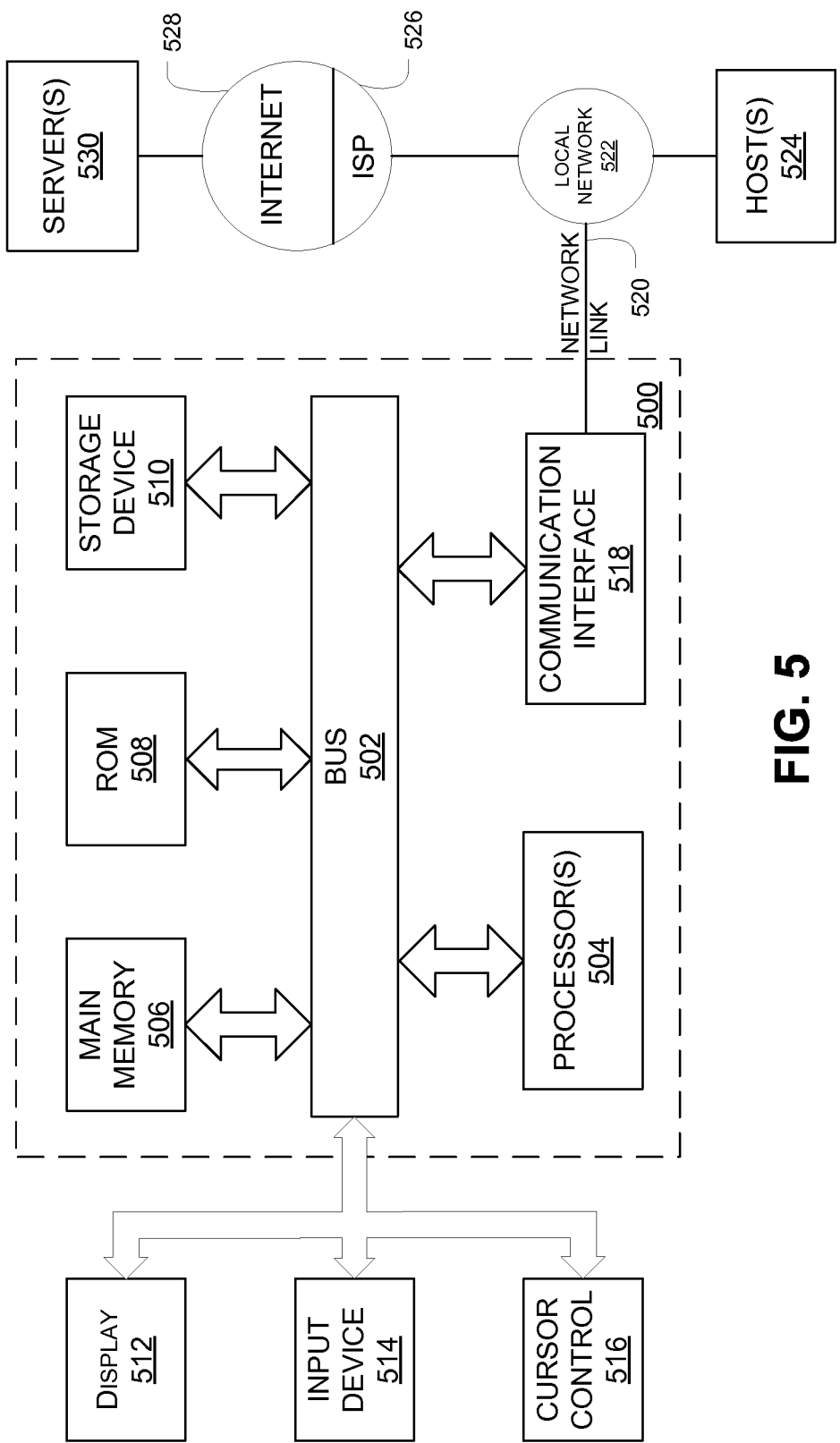
FIG. 5 illustrates a computer system with which certain methods discussed herein may be implemented.

For example, FIG. 5 is a block diagram that illustrates a computer system 500 upon which an embodiment may be implemented. Computer system 500 includes a bus 502 or other communication mechanism for communicating information, and a hardware processor, or multiple processors, 504 coupled with bus 502 for processing information. Hardware processor(s) 504 may be, for example, one or more general purpose microprocessors.

Computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

Computer system 500 may be coupled via bus 502 to a display 512, such as a cathode ray tube (CRT) or LCD display (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 804 and for controlling cursor movement on display 512. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor (s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between nontransitory media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may retrieve and execute the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

TERMINOLOGY

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

The invention claimed is:

1. A method of optimizing display of a multi-column table, the method comprising:
    displaying, within a resizable window having a window width, on a display of a computing system having one or more hardware processors, a container of a first container width, wherein the container comprises first text and second text, and wherein a combined text width comprising a first width of the first text, a second width of the second text, and a divider width of an icon, whitespace, or text between the first text and the second text is less than the first container width, wherein the first text is a label for a first category of objects, and the second text is a label for a second category of objects, and wherein the first category is related to the second category;
    displaying, on the display of the computing system, concurrently with the first text and the second text, a horizontal histogram having a width based on a total number of occurrences associated with the first text and with the second text or based on a total number of conflicts associated with the first text, the second text, and a plurality of additional combinations of text within the multi-column table;
    receiving user input requesting resizing of the resizable window to, at least in part, reduce the window width of the resizable window;
    calculating a second container width that is smaller than the first container width, the second container width corresponding to a reduced first container width by a ratio corresponding to the reduction of the window width of the resizable window by user input;
    determining, by the computing system, whether the combined text width is greater than the second container width;
    in response to determining, by the computing system, that the combined text width is greater than the second container width:
    in response to determining, by the computing system, that the first text width is greater than the second text width, identifying the first text as target text and truncating the first text until the combined text width is less than the second container width or the first text width is equal to the second text width;
    in response to determining, by the computing system, that the second text width is greater than the first text width, identifying the second text as target text and truncating the second text until the combined text width is less than the second container width or the first text width is equal to the second text width; and
    in response to determining, by the computing system, that the first text width is equal to the second text width, identifying both the first text and the second text as target text and truncating the first text and the second text equally until the combined text width is less than the second container width,
    wherein said truncating eliminates one or more characters from the target text in one direction starting from a first side of the target text to an opposite side of the target text.

2. The method of claim 1, further comprising:
    in response to receiving user input requesting resizing of the resizable window:
    resizing the resizable window to a second window width that is smaller than the window;
    resizing the container such that a ratio of the second container width to the first container width is the same as a ratio of the second window width to the window width.

3. The method of claim 1, wherein the horizontal histogram comprises a horizontal bar, and wherein a width of the horizontal bar corresponds with a number of conflicts between occurrences associated with the first text and occurrences associated with the second text.

4. The method of claim 3, wherein the horizontal histogram further comprises at least one smart tick, wherein the at least one smart tick are evenly spaced along a width of the horizontal histogram.

5. The method of claim 3, wherein the horizontal bar is a first color if a number of occurrences associated with the first text is greater than a threshold value, and wherein the horizontal bar is a second color if the number of occurrences associated with the first text is less than the threshold value.

6. The method of claim 1, wherein the combined text width further comprises a width of the horizontal histogram, the method further comprising:
    in response to determining that the combined text width is greater than the second container width:
    in response to determining that the first text width is greater than the second text width, identifying the first text as the target text and truncating the first text until the combined text width is less than the second container width or the first text width is equal to the second text width;
    in response to determining that the second text width is greater than the first text width, identifying the second text as the target text and truncating the second text until the combined text width is less than the second container width or the first text width is equal to the second text width; and in response to determining that the first text width is equal to the second text width, identifying both the first text and the second text as the target text and truncating the first text and the second text equally until the combined text width is less than the second container width.

7. A computing system configured to optimize display of a multi-column table, the computer system comprising:
a network interface that is coupled to a data network for receiving and transmitting one or more packet flows;
a display;
a computer processor; and
a computer readable storage medium storing program instructions configured for execution by the computer processor in order to cause the computing system to:
display, within a resizable window having a window width, on the display, a container of a first container width, wherein the container comprises a first column and a second column, and wherein a combined width comprising a first width of the first column and a second width of the second column is less than the first container width, wherein the first text is a label for a first category of objects, and the second text is a label for a second category of objects, and wherein the first category is related to the second category;
display, on the display, concurrently with the first text and the second text, a horizontal histogram having a width based on a total number of occurrences associated with the first text and with the second text or based on a total number of conflicts associated with the first text, the second text, and a plurality of additional combinations of text within the multi-column table;
receive user input requesting resizing of the resizable window to, at least in part, reduce the window width of the resizable window;
calculate a second container width that is smaller than the first container width, the second container width corresponding to a reduced first container width by a ratio corresponding to the reduction of the window width of the resizable window by user input;
determine whether the combined width is greater than the second container width;
in response to the determination that the combined width is greater than the second container width:
in response to a determination that the first width is greater than the second width, identifying the first text as target text and truncating the first column until the combined width is less than the second container width or the first width is equal to the second width;
in response to a determination that the second width is greater than the first width, identifying the second text as target text and truncating the second column until the combined width is less than the second container width or the first width is equal to the second width; and
in response to a determination that the first width is equal to the second width, identifying both the first text and the second text as target text and truncating the first column and the second column equally until the combined width is less than the second container width,
wherein said truncating eliminates one or more characters from the target text in one direction starting from a first side of the target text to an opposite side of the target text.

8. The computing system of claim 7, wherein the one or more stored program instructions further cause the processor to:
in response to receiving user input requesting resizing of the resizable window:
resize the resizable window to a second window width that is smaller than the window width;
resize the container such that a ratio of the second container width to the first container width is the same as a ratio of the second window width to the window width.

9. The computing system of claim 7, wherein the horizontal histogram comprises a horizontal bar, and wherein a width of the horizontal bar corresponds with a number of conflicts between occurrences associated with the text in the first column and occurrences associated with the text in the second column.

10. The computing system of claim 9, wherein the horizontal histogram further comprises at least one smart tick, wherein the at least one smart tick are evenly spaced along a width of the horizontal histogram.

11. A non-transitory computer-readable medium comprising one or more program instructions recorded thereon, the instructions configured for execution by a computing system comprising one or more hardware processors in order to cause the computing system to:
display, within a resizable window having a window width, on a display of the computing system, a container of a first container width, wherein the container comprises a first column and a second column, and wherein a combined width comprising a first width of the first column and a second width of the second column is less than the first container width, wherein the first text is a label for a first category of objects, and the second text is a label for a second category of objects, and wherein the first category is related to the second category;
display, on the display of the computing system, concurrently with the first text and the second text, a horizontal histogram having a width based on a total number of occurrences associated with the first text and with the second text or based on a total number of conflicts associated with the first text, the second text, and a plurality of additional combinations of text within the multi-column table;
receive user input requesting resizing of the resizable window to, at least in part, reduce the window width of the resizable window;
calculate a second container width that is smaller than the first container width, the second container width corresponding to a reduced first container width by a ratio corresponding to the reduction of the window width of the resizable window by user input;
determine whether the combined width is greater than the second container width;
in response to the determination that the combined width is greater than the second container width:
in response to a determination that the first width is greater than the second width, identifying the first text as target text and truncating the first column until the combined width is less than the second container width or the first width is equal to the second width;
in response to a determination that the second width is greater than the first width, identifying the second text as target text and truncating the second column until the combined width is less than the second container width or the first width is equal to the second width; and
in response to a determination that the first width is equal to the second width, identifying both the first text and the second text as target text and truncating the first column and the second column equally until the combined width is less than the second container width, wherein said truncating eliminates one or more characters from the target text in one direction starting from a first side of the target text to an opposite side of the target text.

12. The non-transitory computer-readable medium of claim 11, wherein the instructions are further configured to cause the computing system to:
  in response to receiving user input requesting resizing of the resizable window:
  resize the resizable window to a second window width that is smaller than the window width;
  resize the container such that a ratio of the second container width to the first container width is the same as a ratio of the second window width to the window width.

13. The non-transitory computer-readable medium of claim 11, wherein the horizontal histogram comprises a horizontal bar, and wherein a width of the horizontal bar corresponds with a number of conflicts between occurrences associated with the text in the first column and occurrences associated with the text in the second column.

14. The non-transitory computer-readable medium of claim 13, wherein the horizontal histogram further comprises at least one smart tick, wherein the at least one smart tick are evenly spaced along a width of the horizontal histogram.

\* \* \* \* \*